(12) United States Patent
Fukuda et al.

(10) Patent No.: US 10,363,830 B2
(45) Date of Patent: Jul. 30, 2019

(54) FUEL CELL VEHICLE

(71) Applicant: HONDA MOTOR CO., LTD., Tokyo (JP)

(72) Inventors: Tetsuya Fukuda, Wako (JP); Takashi Kuwayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/451,409

(22) Filed: Mar. 7, 2017

(65) Prior Publication Data

US 2017/0259694 A1    Sep. 14, 2017

(30) Foreign Application Priority Data

Mar. 9, 2016    (JP) ................. 2016-045399

(51) Int. Cl.
| | | |
|---|---|---|
| B60L 11/18 | (2006.01) | |
| B60K 1/04 | (2019.01) | |
| B60K 15/01 | (2006.01) | |
| B60K 15/063 | (2006.01) | |
| H01M 8/04082 | (2016.01) | |
| B60L 50/71 | (2019.01) | |

(Continued)

(52) U.S. Cl.
CPC ............ B60L 11/1896 (2013.01); B60K 1/04 (2013.01); B60K 15/01 (2013.01); B60K 15/013 (2013.01); B60K 15/063 (2013.01); B60L 50/71 (2019.02); H01M 8/04201 (2013.01); *B60K 2001/0411* (2013.01); *B60K 2015/03315* (2013.01); *B60K 2015/0638* (2013.01); *B60Y 2306/01* (2013.01); *B60Y 2400/202* (2013.01); *H01M 2008/1095* (2013.01); *H01M 2250/20* (2013.01); *Y02T 90/32* (2013.01)

(58) Field of Classification Search
CPC ........... B60K 1/04; B60K 2015/03315; H01M 2008/1095; H01M 8/04201; B60Y 2400/202; B60Y 2306/01; B60L 50/71
See application file for complete search history.

(56) References Cited

U.S. PATENT DOCUMENTS

| | | | | |
|---|---|---|---|---|
| 6,089,513 A | * | 7/2000 | Cau ..................... | B60K 15/01 248/68.1 |
| 6,305,408 B1 | * | 10/2001 | Goto .................... | B60K 15/04 137/351 |

(Continued)

FOREIGN PATENT DOCUMENTS

JP    2002-370544    12/2002

*Primary Examiner* — Cynthia H Kelly
*Assistant Examiner* — Monique M Wills
(74) *Attorney, Agent, or Firm* — Mori & Ward, LLP

(57) ABSTRACT

A fuel cell vehicle includes a fuel cell stack, a fuel tank, a body-side mounting portion, a main fuel pipe, a securing mechanism, and an elastic pipe. The fuel cell stack is disposed in a front section of the fuel cell vehicle. The fuel tank is disposed in a rear section of the fuel cell vehicle. The main fuel pipe connects the fuel tank and the body-side mounting portion. The elastic pipe is connected to the fuel cell stack at a first end of the elastic pipe and connected, via the securing mechanism, to the body-side mounting portion at a second end of the elastic pipe opposite to the first end such that the second end of the elastic pipe is disengaged from the body-side mounting portion when a load larger than a predetermined threshold load is applied to the securing mechanism.

22 Claims, 13 Drawing Sheets

(51) Int. Cl.
*H01M 8/1018* (2016.01)
*B60K 15/03* (2006.01)

(56) References Cited

U.S. PATENT DOCUMENTS

2003/0186092 A1* 10/2003 Takagi .............. H01M 8/04007
                                                    180/65.1
2010/0021795 A1* 1/2010 Takeshita .............. F16L 3/1091
                                                    429/425

* cited by examiner

FUEL CELL VEHICLE

CROSS-REFERENCE TO RELATED APPLICATIONS

The present application claims priority under 35 U.S.C. § 119 to Japanese Patent Application No. 2016-045399, filed Mar. 9, 2016, entitled "Fuel Cell Vehicle." The contents of this application are incorporated herein by reference in their entirety.

BACKGROUND

1. Field

The present disclosure relates to a fuel cell vehicle.

2. Description of the Related Art

A polymer electrolyte fuel cell, for example, is provided with a membrane-electrode assembly (MEA) in which an electrolyte membrane consisting of a polymer ion-exchange membrane has an anode electrode disposed on one side thereof and a cathode electrode disposed on the other side thereof. The membrane-electrode assembly is held between separators, thereby constituting a power generation cell (unit cell). Typically, a predetermined number of power generation cells are stacked and installed in, for example, fuel cell vehicles (fuel cell electric vehicles or the like) as in-vehicle fuel cell stacks.

Japanese Unexamined Patent Application Publication No. 2002-370544, for example, discloses that a fuel cell vehicle is provided with a motor that drives an axle, a fuel cell that powers the motor, and a control unit that controls operation of the motor and the fuel cell. The motor, the fuel cell, and the control unit are disposed within the same vehicle space of the electric vehicle.

SUMMARY

According to one aspect of the present invention, a fuel cell vehicle includes a fuel cell stack, a fuel tank, and a fuel feeding pipe. The fuel cell stack is disposed in a motor compartment provided in a front section of the vehicle and generates electric power by an electrochemical reaction of fuel gas and oxidant gas. The fuel tank is disposed in a rear section of the vehicle and stores the fuel gas. The fuel feeding pipe provides a connection between the fuel cell stack and the fuel tank. The fuel feeding pipe has an elastic pipe portion that is secured at one end to the fuel cell stack and at the other end to a body-side mounting portion. The other end of the elastic pipe portion and the body-side mounting portion are coupled to each other with a securing mechanism. The other end of the elastic pipe portion is disengaged from the body-side mounting portion when the fuel cell stack moves relatively away from the body-side mounting portion in response to application of a predetermined load.

According to another aspect of the present invention, a fuel cell vehicle includes a fuel cell stack, a fuel tank, a body-side mounting portion, a main fuel pipe, a securing mechanism, and an elastic pipe. The fuel cell stack is disposed in a front section of the fuel cell vehicle to generate electric power via an electrochemical reaction of fuel gas and oxidant gas. The fuel tank stores the fuel gas therein. The fuel tank is disposed in a rear section of the fuel cell vehicle. The main fuel pipe connects the fuel tank and the body-side mounting portion to supply fuel from the fuel tank to the fuel cell stack. The elastic pipe is connected to the fuel cell stack at a first end of the elastic pipe and connected, via the securing mechanism, to the body-side mounting portion at a second end of the elastic pipe opposite to the first end such that the second end of the elastic pipe is disengaged from the body-side mounting portion when a load larger than a predetermined threshold load is applied to the securing mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
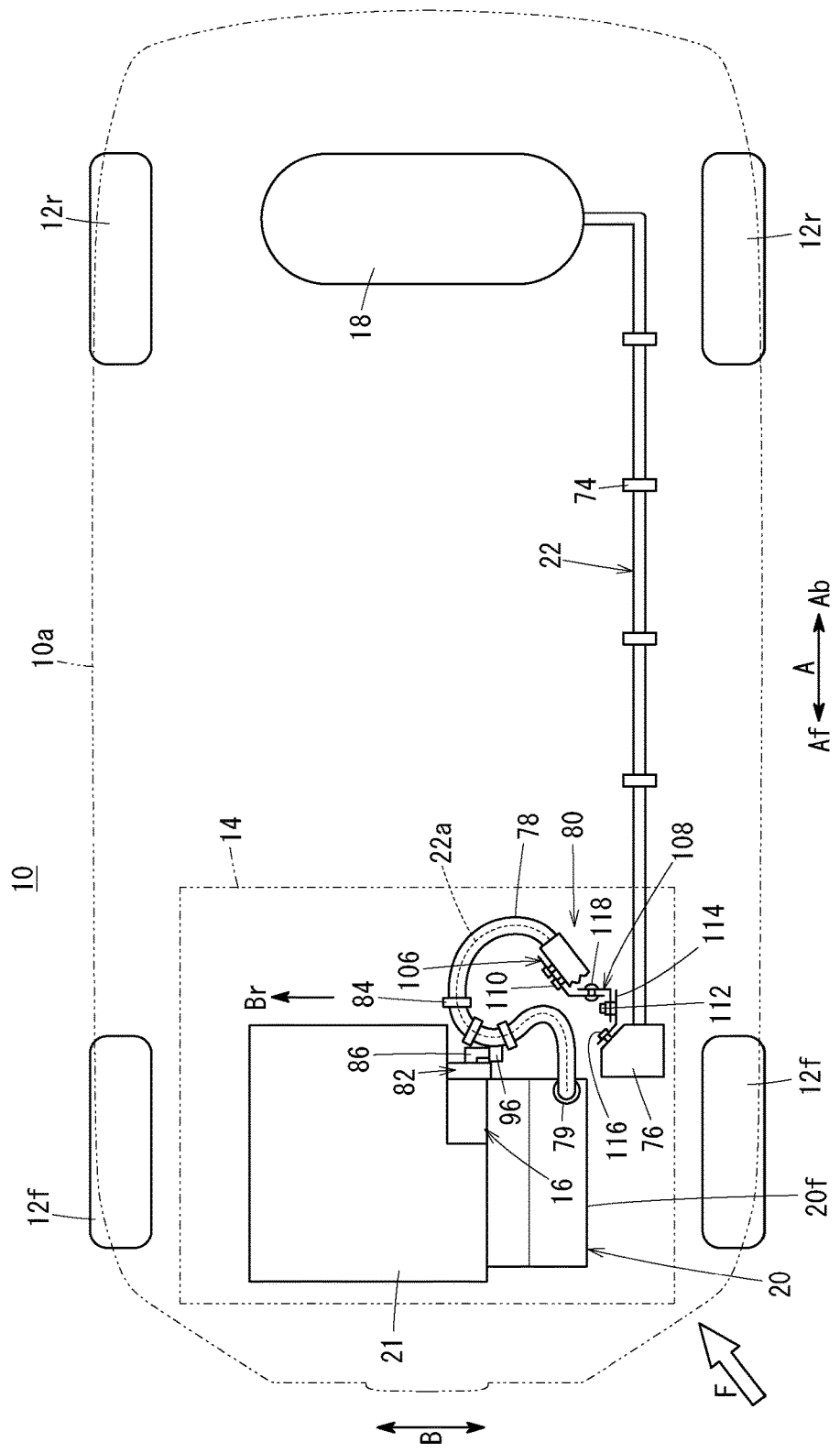
FIG. 1 is an explanatory plan view of a fuel cell vehicle according to a first embodiment of the present application.

The embodiments will now be described with reference to the accompanying drawings, wherein like reference numerals designate corresponding or identical elements throughout the various drawings.

As shown in FIG. 1, a fuel cell vehicle (such as a fuel cell electric vehicle or the like) 10 according to a first embodiment of the present application has a fuel cell stack 16 disposed in a motor compartment 14 that is located close to front wheels 12f, 12f. In addition, the fuel cell vehicle 10 has a hydrogen tank (fuel tank) 18 containing high-pressure hydrogen disposed between rear wheels 12r, 12r.

A group of fuel gas devices 20 are disposed at one end in the stacking direction (to be described later) (or one end in the direction indicated by arrow B) of the fuel cell stack 16, while a control device 21 is placed on the top of the fuel cell stack 16. The control device 21 constitutes, for example, a voltage control unit (VCU) that controls output from the fuel cell stack 16. The fuel cell stack 16 and the hydrogen tank 18 are connected to each other via a fuel feeding pipe 22.

Figure 2:
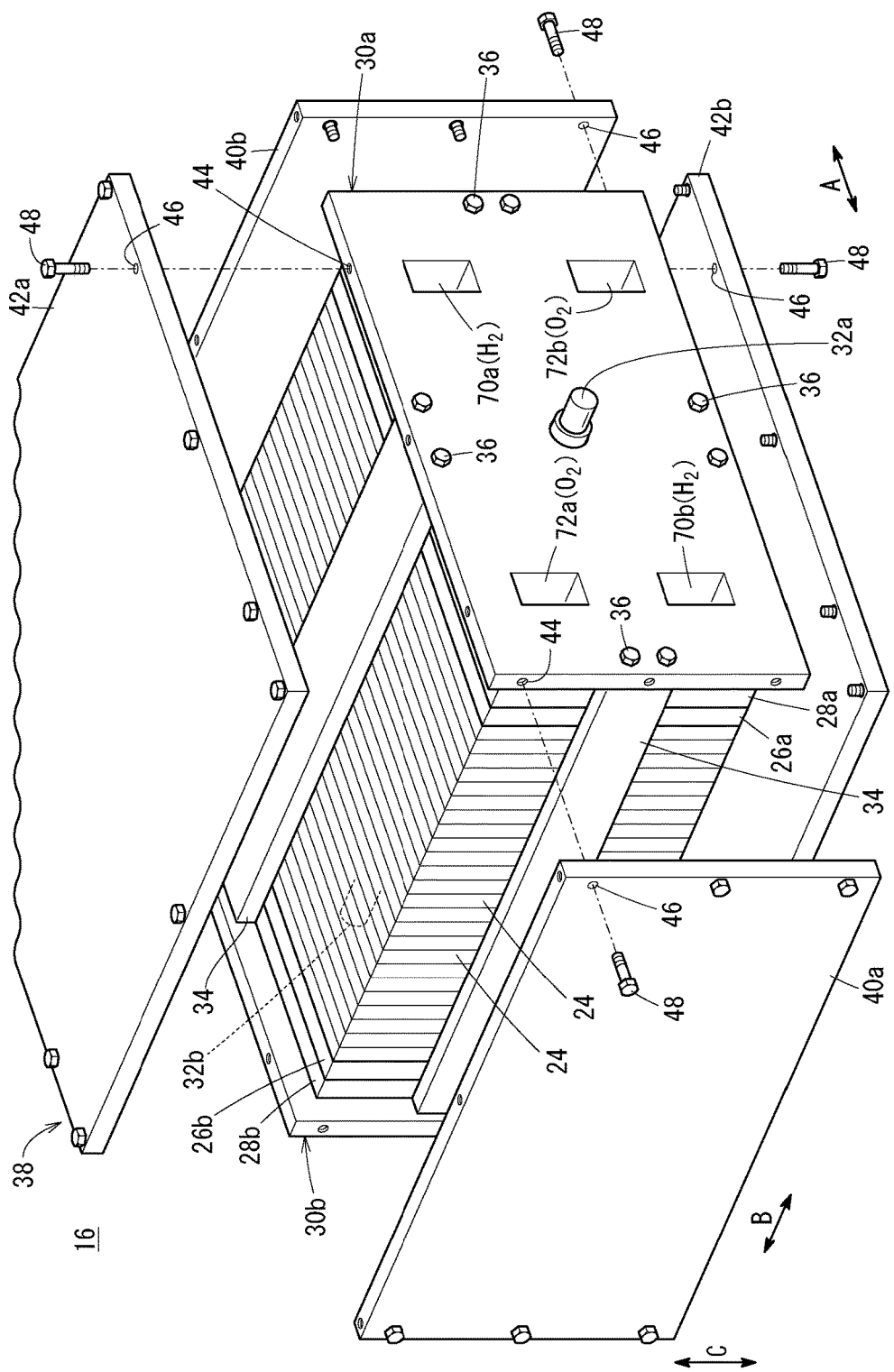
FIG. 2 is an explanatory exploded perspective view of a fuel cell stack and a casing that constitute the fuel cell vehicle.

As shown in FIG. 2, the fuel cell stack 16 has a plurality of power generation cells 24 stacked in the vehicle-width direction (indicated by arrow B) or in the longitudinal direction (indicated by arrow A) of a vehicle. The array of power generation cells 24 has a first terminal plate 26*a*, a first insulating plate 28*a*, and a first end plate 30*a* disposed at one end in the stacking direction thereof in this order toward the outside. In addition, the array of power generation cells 24 has a second terminal plate 26*b*, a second insulating plate 28*b*, and a second end plate 30*b* disposed at the other end in the stacking direction thereof in this order toward the outside.

The horizontally long rectangular first end plate 30*a* has a first power output terminal 32*a* connected to the first terminal plate 26*a* extending outward from a substantially central portion thereof (which may be decentered from the central portion). In addition, the horizontally long rectangular second end plate 30*b* has a second power output terminal 32*b* connected to the second terminal plate 26*b* extending outward from a substantially central portion thereof (which may be decentered from the central portion). The first end plate 30*a* and the second end plate 30*b* have coupling bars 34 provided therebetween so as to be at opposite sides thereof and are coupled to each other with the coupling bars 34, both ends of which are fastened thereto with a plurality of bolts 36, thereby applying a clamp load to the plurality of stacked power generation cells 24 in the stacking direction (indicated by arrow B).

The fuel cell stack 16 is provided with a casing 38, if required. Two faces (or surfaces) disposed at both ends in the direction of the casing 38 indicated by arrow B consist of the first end plate 30*a* and the second end plate 30*b*. In addition, two faces (or surfaces) disposed at both ends in the direction of the casing 38 indicated by arrow A consist of a first side panel 40*a* and a second side panel 40*b*, both of which are formed in a horizontally long rectangular plate-like shape. Furthermore, two faces (or surfaces) disposed in the height direction (indicated by arrow C) of the casing 38 consist of an upper side panel 42*a* and a lower side panel 42*b*. The upper side panel 42*a* and the lower side panel 42*b* have a horizontally long rectangular plate-like shape.

The first end plate 30*a* and the second end plate 30*b* have threaded holes 44 formed in end surfaces thereof. The first side panel 40*a*, the second side panel 40*b*, the upper side panel 42*a*, and the lower side panel 42*b* have holes 46 formed so as to oppose the threaded holes 44. Bolts 48 are inserted through the holes 46 and are screwed into the threaded holes 44, thereby securing the casing 38 in an integral manner.

Figure 3:
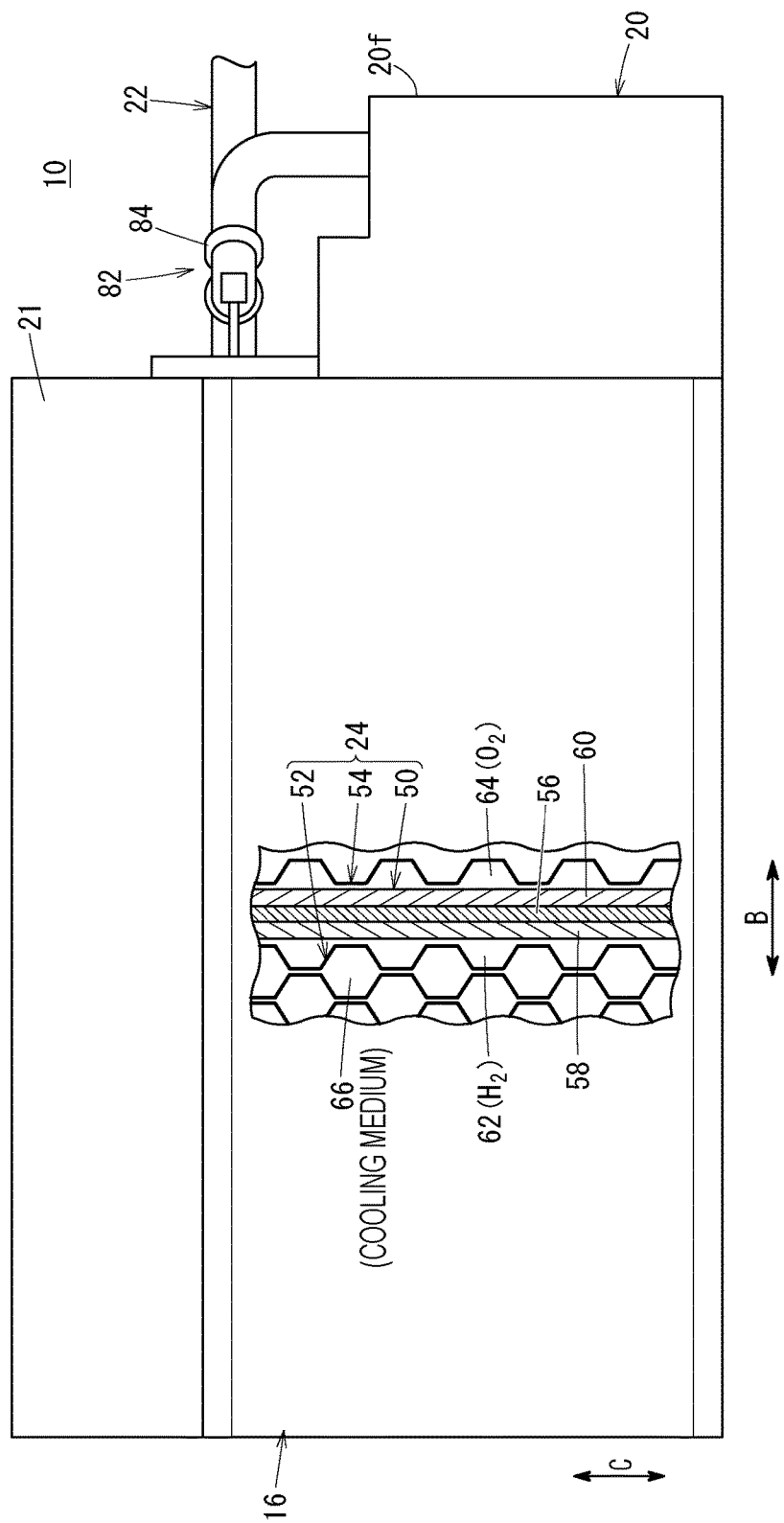
FIG. 3 is an explanatory side view showing a cross-section of part of the fuel cell stack.

As shown in FIG. 3, each of the power generation cells 24 has a membrane-electrode assembly 50 held between a first separator 52 and a second separator 54. The first separator 52 and the second separator 54 consist of a metal separator or a carbon separator.

The membrane-electrode assembly 50 is provided with a solid polymer electrolyte membrane 56 that is a thin membrane of a water-containing perfluorosulfonic acid, and an anode electrode 58 and a cathode electrode 60 that hold the solid polymer electrolyte membrane 56 therebetween. In addition to a fluorine-based electrolyte, a hydrocarbon-based electrolyte is used for the solid polymer electrolyte membrane 56.

A fuel gas flow passage 62 for supplying fuel gas to the anode electrode 58 is provided between the first separator 52 and the membrane-electrode assembly 50. In addition, an oxidant gas flow passage 64 for supplying oxidant gas to the cathode electrode 60 is provided between the second separator 54 and the membrane-electrode assembly 50. Furthermore, a cooling medium flow passage 66 for circulating cooling medium is provided between the first separator 52 and the second separator 54 that are located adjacent to each other.

As shown in FIG. 2, a fuel gas inlet communication hole 70*a* and a fuel gas outlet communication hole 70*b* are formed in the first end plate 30*a* of the fuel cell stack 16 so as to communicate with each other in the stacking direction of the power generation cells 24. Likewise, an oxidant gas inlet communication hole 72*a* and an oxidant gas outlet communication hole 72*b* are formed in the first end plate 30*a* of the fuel cell stack 16 so as to communicate with each other in the stacking direction of the power generation cells 24. Fuel gas, such as a hydrogen-containing gas (hereinafter also referred to as hydrogen gas), is circulated through the fuel gas inlet communication hole 70*a* and the fuel gas outlet communication hole 70*b*, through which the fuel gas is supplied to the fuel gas flow passage 62. In addition, oxidant gas, such as an oxygen-containing gas (hereinafter also referred to as air), is circulated through the oxidant gas inlet communication hole 72*a* and the oxidant gas outlet communication hole 72*b*, through which the oxidant gas is supplied to the oxidant gas flow passage 64.

A cooling medium inlet communication hole and a cooling medium outlet communication hole (not illustrated) are formed in the second end plate 30*b* of the fuel cell stack 16 so as to communicate with each other in the stacking direction of the power generation cells 24. Cooling medium, such as pure water, ethylene, glycol, oil, or the like, is circulated through the cooling medium inlet communication hole and the cooling medium outlet communication hole, through which the cooling medium is supplied to the cooling medium flow passage 66.

Figure 4:
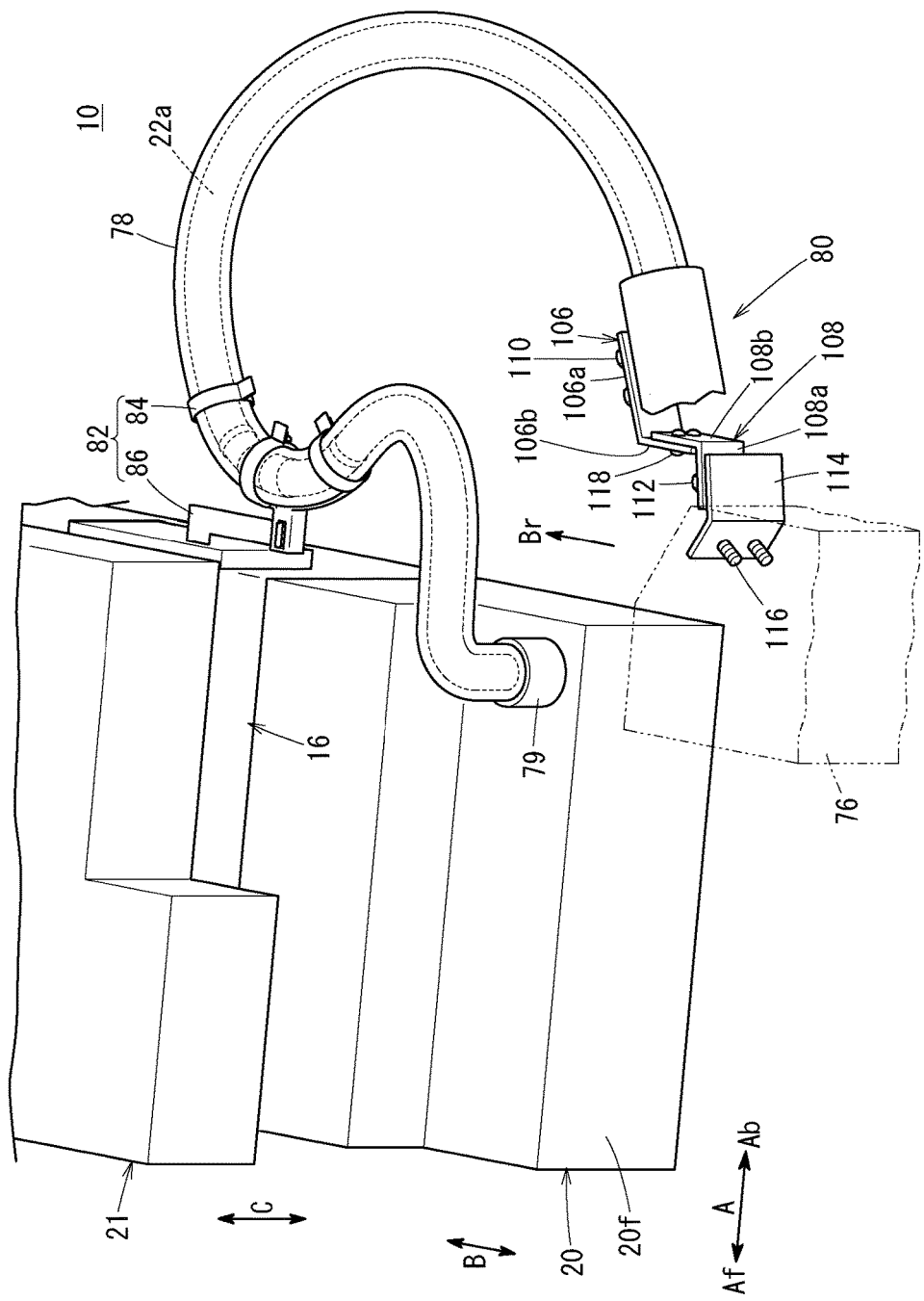
FIG. 4 is an explanatory perspective view of an elastic pipe portion that constitutes the fuel cell stack and a fuel feeding pipe.

As shown in FIGS. 3 and 4, the group of fuel gas devices 20 is provided with an ejector, a hydrogen pump, a gas-liquid separator, valves (purge valve, check valve, and the like), and, if required, an injector and is covered with a device cover 20*f*. The fuel feeding pipe 22 is connected to the group of fuel gas devices 20.

As shown in FIG. 1, the fuel feeding pipe 22 extends from the rear section of the fuel cell vehicle 10 toward the front section and is secured to a vehicle body 10*a* of the fuel cell vehicle 10 with a plurality of securing devices 74 therebetween. The fuel feeding pipe 22 is connected at a front end thereof (in the direction indicated by arrow Af) to a body-side mounting portion 76, while an elastic pipe portion 22*a* is provided between the body-side mounting portion 76 and the group of fuel gas devices 20. The elastic pipe portion 22*a* is covered with a flexible duct 78.

As shown in FIG. 4, the elastic pipe portion 22*a* is provided at one end thereof with a joint 79 that is connected (secured) to the group of fuel gas devices 20. The other end of the elastic pipe portion 22*a* and the body-side mounting portion 76 are coupled to each other so as to be disengageable by use of a securing mechanism 80 to be described later.

The elastic pipe portion 22*a* is curved between the body-side mounting portion 76 and the group of fuel gas devices 20 between which the length of the pipe is maintained at a certain level or more. The elastic pipe portion 22*a* is provided at a halfway portion thereof with a retaining member 82 that retains the elastic pipe portion 22*a* on the fuel cell stack 16 and is disengageable when subjected to a predetermined load.

The retaining member 82 is provided with a holder 84 that holds the elastic pipe portion 22a in a curved state and a locking pawl 86 that is mounted on the fuel cell stack 16, or more specifically, the device cover 20f of the group of fuel gas devices 20 and is engageable and disengageable with the holder 84. As shown in FIG. 3, the retaining member 82 is disposed below an upper end of the fuel cell stack 16 (more specifically, an upper end of the control device 21).

Figure 5:
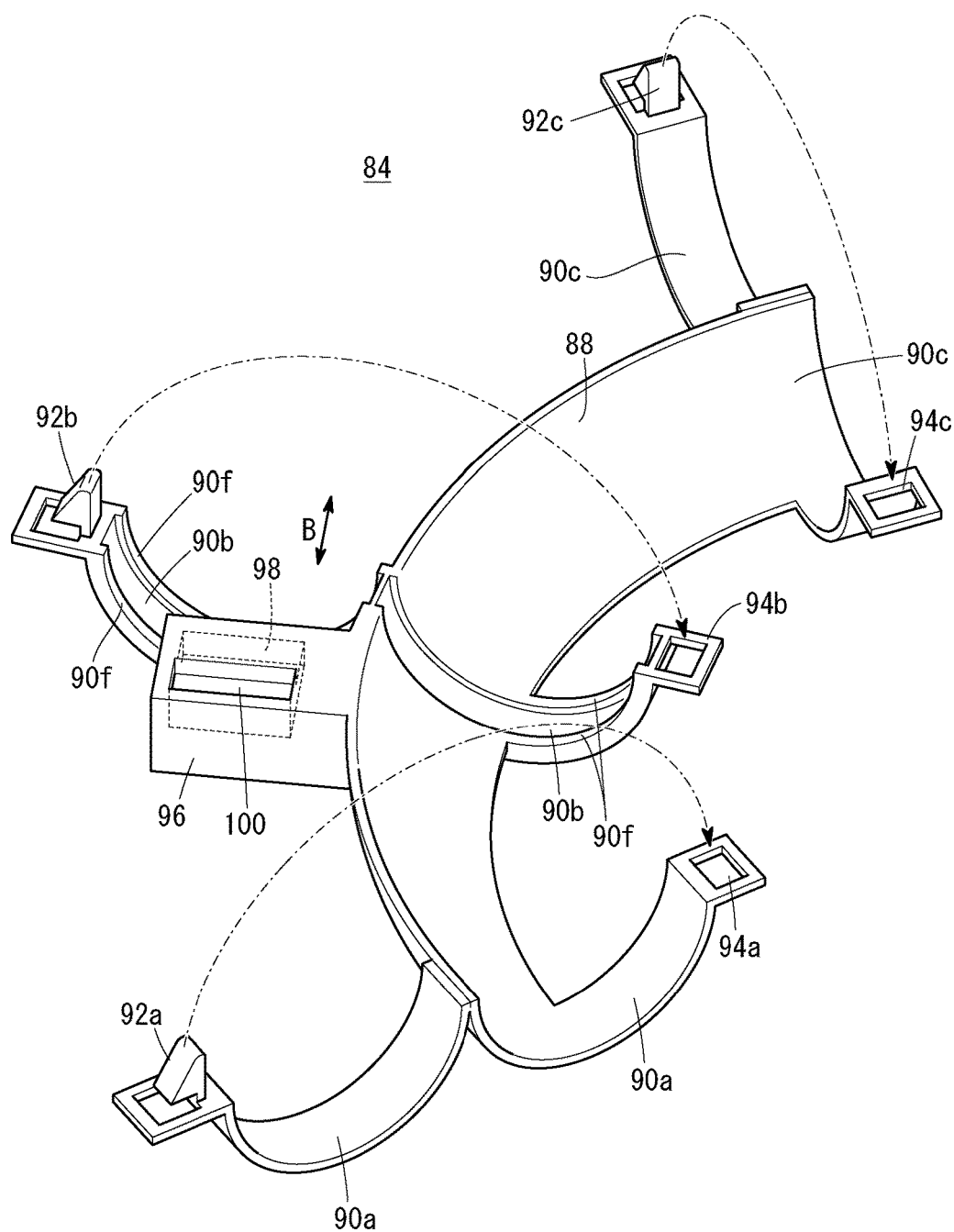
FIG. 5 is an explanatory perspective view of a holder that secures the elastic pipe portion.

As shown in FIG. 5, the holder 84 is provided with a supporting region 88 having a shape formed along a curved shape in the radial direction and along a curved shape in the circumferential direction of the flexible duct 78. The supporting region 88 is provided with a pair of curved regions 90a, a pair of curved regions 90b, and a pair of curved regions 90c, that are openable and closable and that circumferentially hold the flexible duct 78 when put in a closed state. The curved regions 90a, 90b, 90c are provided at one end thereof with pawls 92a, 92b, 92c, respectively, while the curved regions 90a, 90b, 90c are provided at the other end thereof with holes 94a, 94b, 94c that are engaged with the pawls 92a, 92b, 92c, respectively.

As described later, the curved region 90b is provided at both sides thereof with flanges 90f that cover a section of a first duct 78a and a section of a second duct 78b. Note that, if the flexible duct 78 consists of a single component, the curved region 90b has the same structure as the curved regions 90a, 90c.

Figure 6:
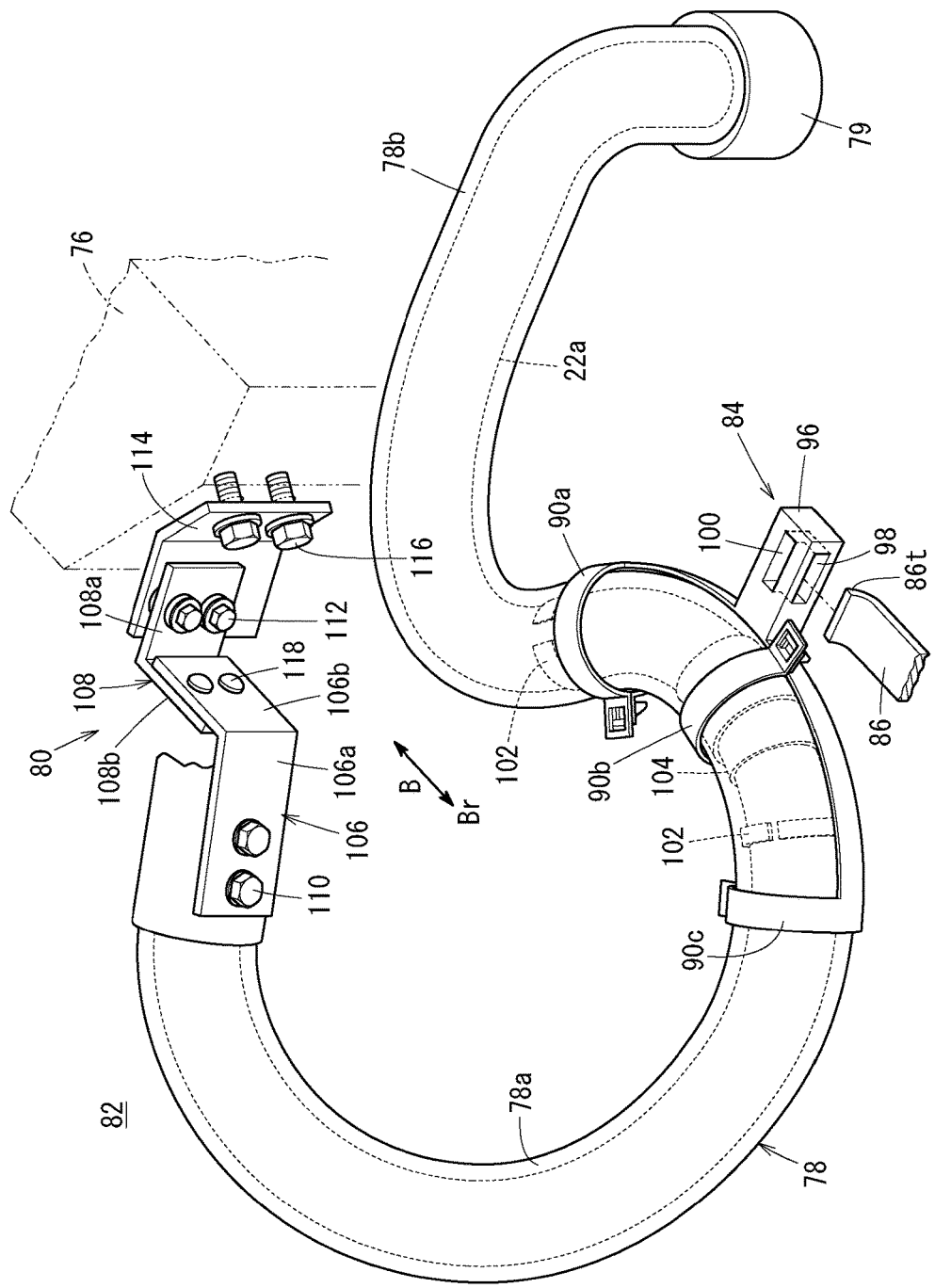
FIG. 6 is an explanatory perspective view showing a state in which a retaining member is disengaged.

The supporting region 88 is provided on an outer circumference thereof with a block-like securing region 96. The securing region 96 has a rectangular-shaped opening 98 with one end opened to the outside, while the opening 98 has a lock opening 100 formed in an upper surface thereof. As shown in FIG. 6, a locking pawl 86 has a projection 86t formed at an end thereof so as to project in the direction of thickness.

While the locking pawl 86 is inserted into the opening 98 of the securing region 96, the projection 86t is inserted into the lock opening 100, thereby securing the holder 84 to the locking pawl 86. When the projection 86t is pressed down, the locking pawl 86 can be disengaged from the holder 84 in the direction indicated by arrow B. The direction in which the locking pawl 86 is installed or removed is the same as the vehicle-width direction.

As shown in FIG. 6, a clip 102 having a C-shaped section, when seen in the side view, is provided between the elastic pipe portion 22a and the flexible duct 78 so as to run along a curved portion of the elastic pipe portion 22a. The flexible duct 78 is divided into, for example, two sections including the first duct 78a and the second duct 78b. The elastic pipe portion 22a is provided at a halfway portion thereof with a joint 104 one side of which is in contact with the first duct 78a and the other side of which is in contact with the second duct 78b.

As shown in FIGS. 1, 4, and 6, the securing mechanism 80 is provided with a pipe-side coupling member 106 provided at the other end of the elastic pipe portion 22a and a body-side coupling member 108 provided on the body-side mounting portion 76. The pipe-side coupling member 106 and the body-side coupling member 108 have the shape of a bent plate.

As shown in FIGS. 4 and 6, the pipe-side coupling member 106 is provided in an integral manner with an extending region 106a that extends along a circumferential surface of the elastic pipe portion 22a and that is secured to the circumferential surface with bolts 110 and a securing region 106b that is bent toward a tip of the elastic pipe portion 22a from an end of the extending region 106a.

The body-side coupling member 108 is provided in an integral manner with an extending region 108a that is secured to a securing plate 114 with a pair of rubber mounts 112 therebetween and a securing region 108b that is bent toward a tip of the elastic pipe portion 22a from an end of the extending region 108a. The securing plate 114 is secured to the body-side mounting portion 76 with bolts 116.

The securing region 106b of the pipe-side coupling member 106 and the securing region 108b of the body-side coupling member 108 are secured to each other with a plurality of, for example, two rivets 118. As shown in FIG. 1, the securing regions 106b, 108b overlap each other so as to extend in the direction (indicated by arrow Br) in which the fuel cell stack 16 moves relatively away from the body-side mounting portion 76 when subjected to an external load F. A shearing load of the rivets 118 is configured to be smaller than the breaking load of the elastic pipe portion 22a.

The fuel cell vehicle 10 will be described below in terms of operation.

As shown in FIG. 1, high-pressure gas stored in the hydrogen tank 18 is delivered in the form of fuel gas to the fuel feeding pipe 22. Then, the fuel gas is supplied through the fuel feeding pipe 22 to the group of fuel gas devices 20 and to the fuel gas inlet communication hole 70a provided in the first end plate 30a of the fuel cell stack 16, as shown in FIG. 2. The fuel gas is introduced into the fuel gas flow passages 62 of the first separators 52 that constitute the power generation cells 24, as shown in FIG. 3. The fuel gas flows through the fuel gas flow passages 62 into the anode electrodes 58 of the membrane-electrode assemblies 50.

At the same time, oxidant gas is supplied to the oxidant gas inlet communication hole 72a provided in the first end plate 30a, as shown in FIG. 2. The oxidant gas is introduced into the oxidant gas flow passages 64 of the second separators 54 that constitute the power generation cells 24 and is supplied to the cathode electrodes 60 of the membrane-electrode assemblies 50, as shown in FIG. 3.

With this arrangement, in the membrane-electrode assemblies 50, the electrochemical reaction of the fuel gas supplied to the anode electrodes 58 and the oxidant gas supplied to the cathode electrodes 60 takes place in electrode catalyst layers, thereby generating electric power. The generated electric power is supplied to electric motors (not illustrated), making the fuel cell vehicle 10 ready to run. Cooling medium are supplied to the cooling medium flow passage 66 from the cooling medium cooling device (not illustrated).

As shown in FIG. 1, when the fuel cell vehicle 10 is subjected at a frontal offset position thereof to an external load F, the fuel cell stack 16 may be displaced in the direction indicated by arrow Br relative to the vehicle body 10a. At this time, the locking pawl 86 is disengaged from the opening 98 of the holder 84, while the elastic pipe portion 22a is held only by the joint 104, thereby maintaining the length of the pipe that can absorb the displacement of the fuel cell stack 16, as shown in FIG. 6.

In some cases, the fuel cell stack 16 may be displaced farther in the direction of arrow Br, namely, in the direction in which the fuel cell stack 16 moves away from the body-side mounting portion 76. Under this situation, a tensile force is likely to act on the elastic pipe portion 22a whose both ends are connected to the fuel cell stack 16 and the body-side mounting portion 76.

In the first embodiment, the other end of the elastic pipe portion 22a and the body-side mounting portion 76 are coupled to each other with the securing mechanism 80 therebetween. As shown in FIGS. 4 and 6, the securing mechanism 80 is provided with the pipe-side coupling member 106 provided on the elastic pipe portion 22a, the body-side coupling member 108 provided on the body-side mounting portion 76, and the rivets 118 with which the pipe-side coupling member 106 and the body-side coupling member 108 are coupled to each other in an integral manner. In addition, a shearing load of the rivets 118 is configured to be smaller than the breaking load of the elastic pipe portion 22a.

Figure 7:
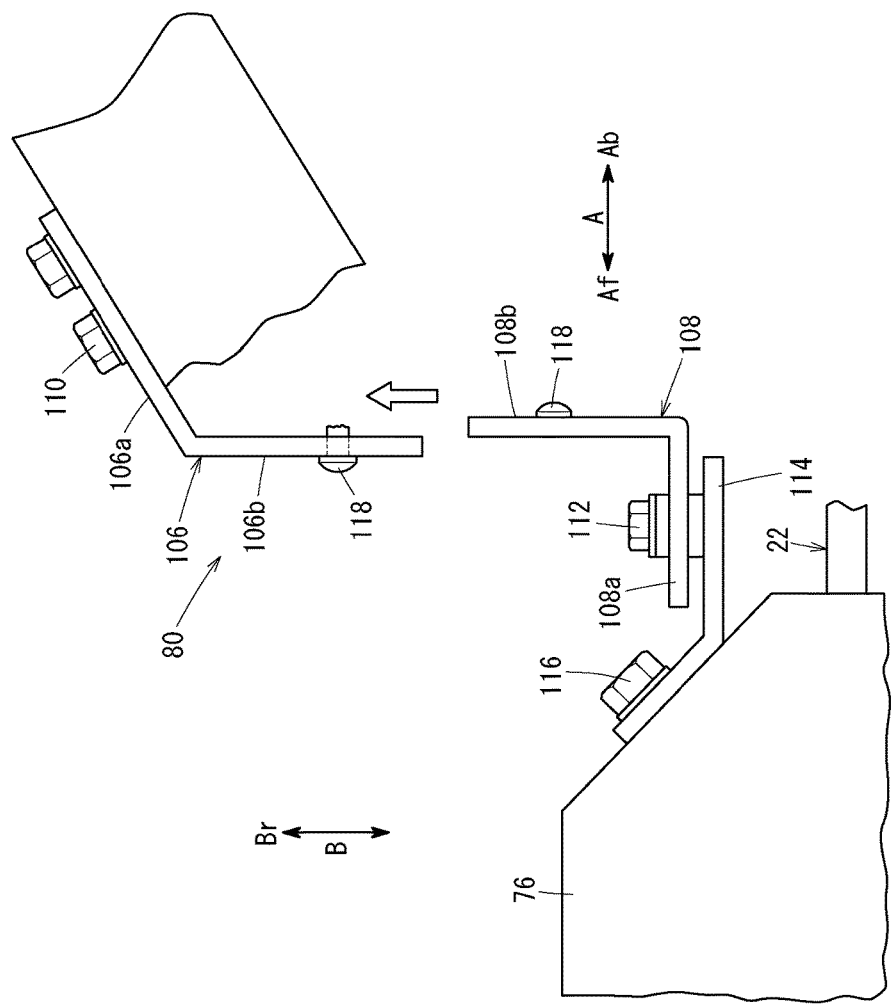
FIG. 7 is an explanatory view showing a state in which a securing mechanism for coupling the elastic pipe portion and a body-side mounting portion to each other is disengaged.

Accordingly, as shown in FIG. 7, when the fuel cell stack 16 moves relatively from the body-side mounting portion 76 in response to application of the external load F that is a predetermined load, the rivets 118 are broken due to the tensile force acting on the elastic pipe portion 22a. In other words, the pipe-side coupling member 106 of the elastic pipe portion 22a is disengaged from the body-side coupling member 108 of the body-side mounting portion 76.

In addition, the securing region 106b of the pipe-side coupling member 106 and the securing region 108b of the body-side coupling member 108 overlap each other so as to extend in the direction in which the fuel cell stack 16 moves relatively away from the body-side mounting portion 76. The rivets 118 are provided at a position on which a shearing force acts in the direction of the tensile force exerted on the elastic pipe portion 22a, thereby ensuring that the rivets 118, when subjected to the external force F, are broken.

Consequently, in the first embodiment, a simple and compact configuration can suppress breakage of the elastic pipe portion 22a as much as possible when the external load F is applied, while holding the elastic pipe portion 22a.

Figure 8:
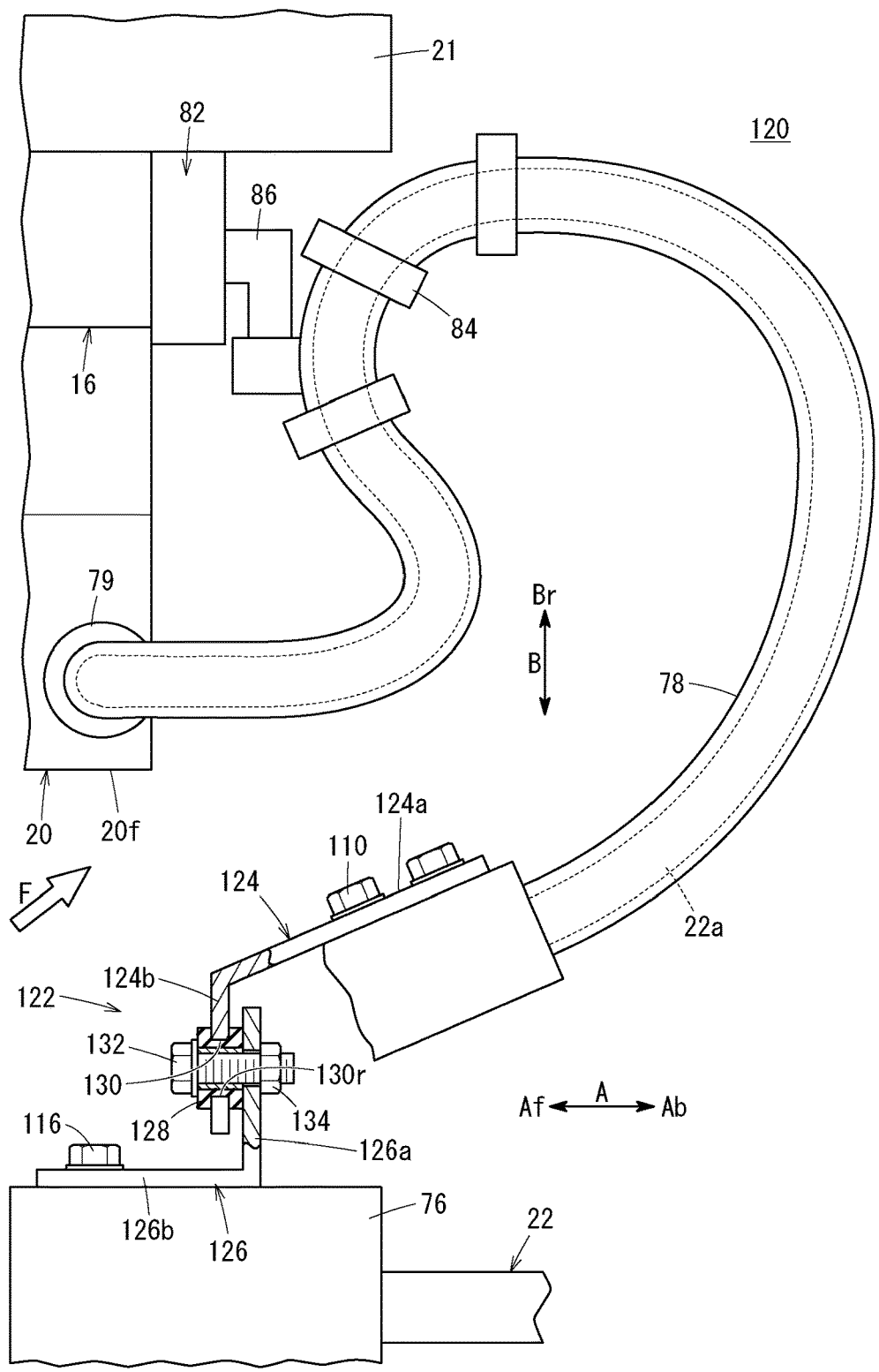
FIG. 8 is an explanatory plan view of a principal part of a fuel cell vehicle according to a second embodiment of the present application.

FIG. 8 is an explanatory plan view of principal part of a securing mechanism 122 that constitutes a fuel cell vehicle 120 according to a second embodiment. In the second embodiment, the same components as those of the fuel cell vehicle 10 according to the first embodiment have the same reference numerals and symbols assigned, and repeated descriptions of the same components are omitted.

Figure 9:
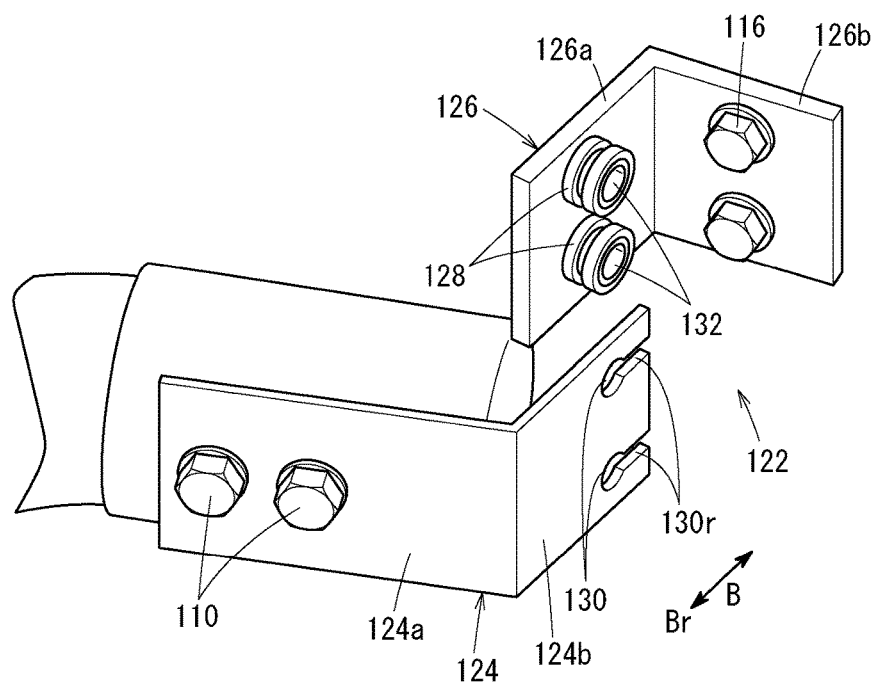
FIG. 9 is an explanatory perspective view of a securing mechanism that constitutes the fuel cell vehicle.

As shown in FIGS. 8 and 9, the securing mechanism 122 is provided with a pipe-side coupling member 124 provided at the other end of the elastic pipe portion 22a and a body-side coupling member 126 provided on the body-side mounting portion 76. The pipe-side coupling member 124 and the body-side coupling member 126 are coupled to each other with a pair of rubber mounts 128.

The pipe-side coupling member 124 is provided in an integral manner with an extending region 124a and a securing region 124b that is bent from an end of the extending region 124a. As shown in FIG. 9, the securing region 124b has a pair of holes 130 into which the rubber mounts 128 are fitted. The holes 130 have cutouts 130r that extend in the direction (indicated by arrow Br) in which the fuel cell stack 16 moves relatively away from the body-side mounting portion 76 and from which the rubber mounts 128 are disengageable. The disengaging load at which the rubber mounts 128 are disengaged from the cutouts 130r is configured to be lower than the breaking load of the elastic pipe portion 22a.

The body-side coupling member 126 is provided in an integral manner with an extending region 126a and a securing region 126b that is bent from an end of the extending region 126a. The extending region 126a is provided with the pair of rubber mounts 128 with bolts 132 and nuts 134 therebetween.

With this arrangement, in the second embodiment, when an external load F is applied, the disengagement of the locking pawl 86 from the holder 84 is followed by the disengagement of the pipe-side coupling member 124 constituting the securing mechanism 122 from the body-side coupling member 126. More specifically, a tensile force is exerted on the pipe-side coupling member 124 from the elastic pipe portion 22a, resulting in a shearing load being applied to between the pipe-side coupling member 124 and the body-side coupling member 126.

Note that the disengaging load at which the rubber mounts 128 are disengaged from the cutouts 130r is configured to be lower than the breaking load of the elastic pipe portion 22a. As a result, the rubber mounts 128 are disengaged from the cutouts 130r, thereby enabling the pipe-side coupling member 124 to be disengaged from the body-side coupling member 126. With this arrangement, a simple and compact configuration can suppress breakage of the elastic pipe portion 22a as much as possible when the external load F is applied, while holding the elastic pipe portion 22a, providing the same effects as the first embodiment described above.

Figure 10:
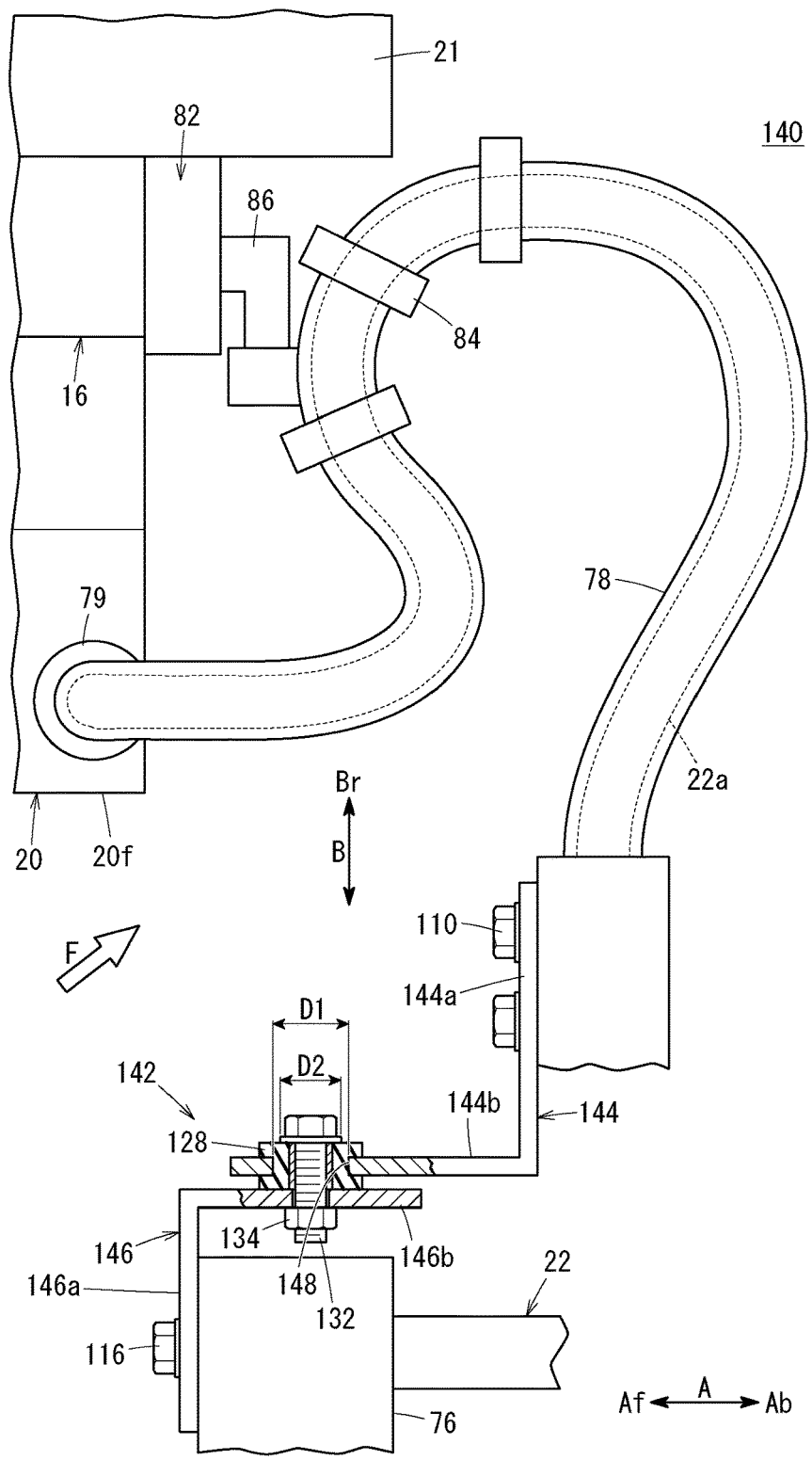
FIG. 10 is an explanatory plan view of a principal part of a fuel cell vehicle according to a third embodiment of the present application.

FIG. 10 is an explanatory plan view of principal part of a securing mechanism 142 constituting a fuel cell vehicle 140 according to a third embodiment of the present application. In the third embodiment, the same components as those of the fuel cell vehicle 120 according to the second embodiment have the same reference numerals and symbols assigned, and repeated descriptions of the same components are omitted.

The securing mechanism 142 is provided with a pipe-side coupling member 144 provided at the other end of the elastic pipe portion 22a and a body-side coupling member 146 provided on the body-side mounting portion 76. The pipe-side coupling member 144 and the body-side coupling member 146 are coupled to each other with a pair of rubber mounts 128.

The pipe-side coupling member 144 is provided in an integral manner with an extending region 144a and a securing region 144b that is bent from an end of the extending region 144a. The securing region 144b has a pair of holes 148 into which the rubber mounts 128 are fitted. The holes 148 axially extend in the direction (indicated by arrow Br) in which the fuel cell stack 16 moves relatively away from the body-side mounting portion 76. The opening size D1 of the holes 148 are configured to be larger than the head size D2 of the bolts 132 (D1>D2). In addition, the disengaging load at which the rubber mounts 148 are disengaged from the holes 148 is configured to be lower than the breaking load of the elastic pipe portion 22a.

The body-side coupling member 146 is provided in an integral manner with an extending region 146a and a securing region 146b that is bent from an end of the extending region 146a. The securing region 146b is provided with the pair of rubber mounts 128 with the bolts 132 and the nuts 134 therebetween.

With this arrangement, in the third embodiment, when an external load F is applied, the disengagement of the locking pawl 86 from the holder 84 is followed by the disengagement of the pipe-side coupling member 144 constituting the securing mechanism 142 from the body-side coupling member 146. More specifically, a tensile force is exerted on the pipe-side coupling member 144 from the elastic pipe portion 22a, resulting in a segregational load being applied to between the pipe-side coupling member 144 and the body-side coupling member 146 in the direction in which the pipe-side and body-side coupling members 144, 146 are moved away from each other.

Note that the disengaging load at which the rubber mounts 128 are disengaged from the holes 148 is configured to be lower than the breaking load of the elastic pipe portion 22a.

Figure 11:
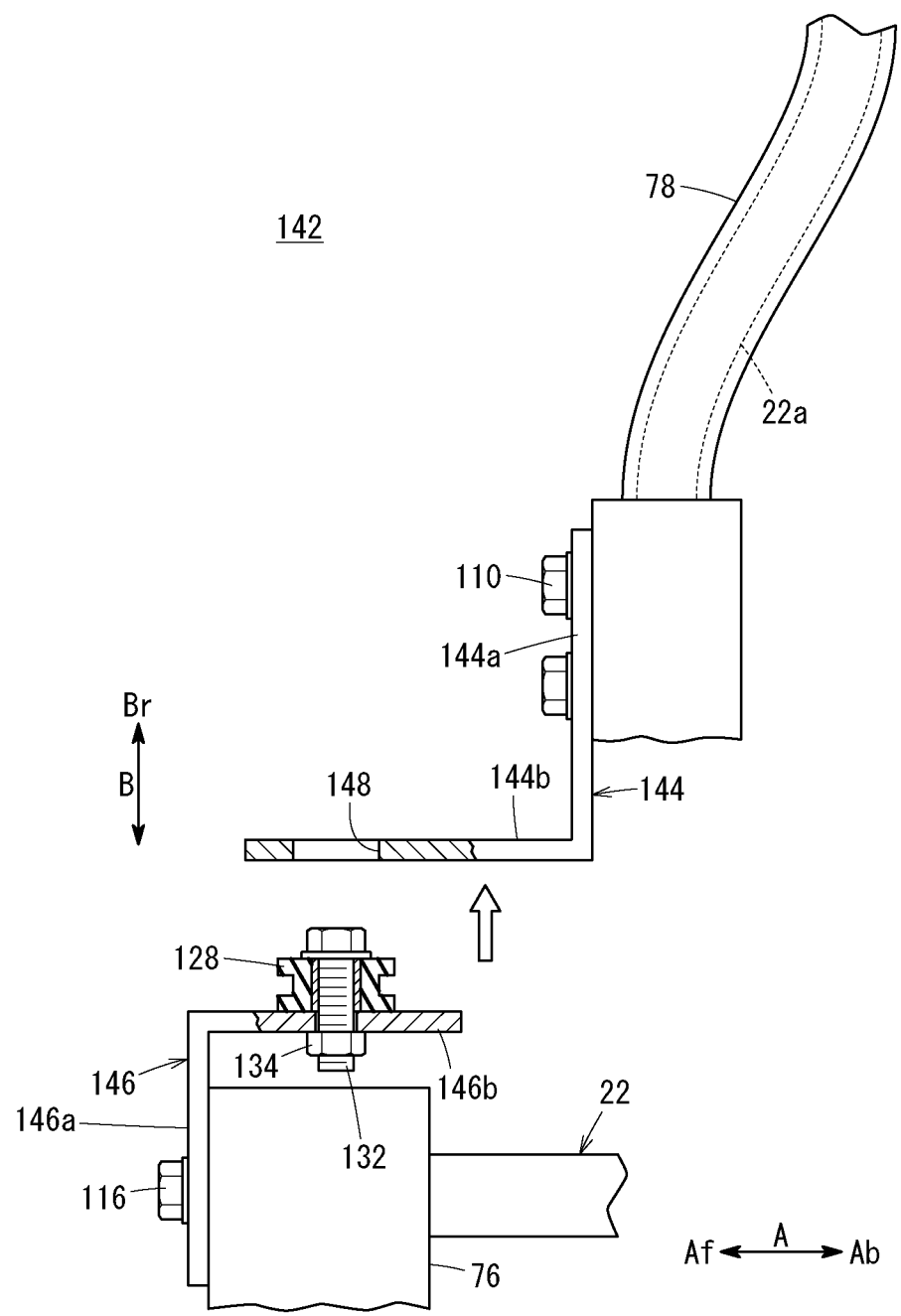
FIG. 11 is an explanatory plan view showing a state in which a securing mechanism constituting the fuel cell vehicle is disengaged.

As a result, as shown in FIG. 11, the rubber mounts 128 are disengaged from the holes 148, thereby enabling the pipe-side coupling member 144 to be disengaged from the body-side coupling member 146. With this arrangement, a simple and compact configuration can suppress breakage of the elastic pipe portion 22a as much as possible when the external load F is applied, while holding the elastic pipe portion 22a, providing the same effects as the first and second embodiments described above.

Figure 12:
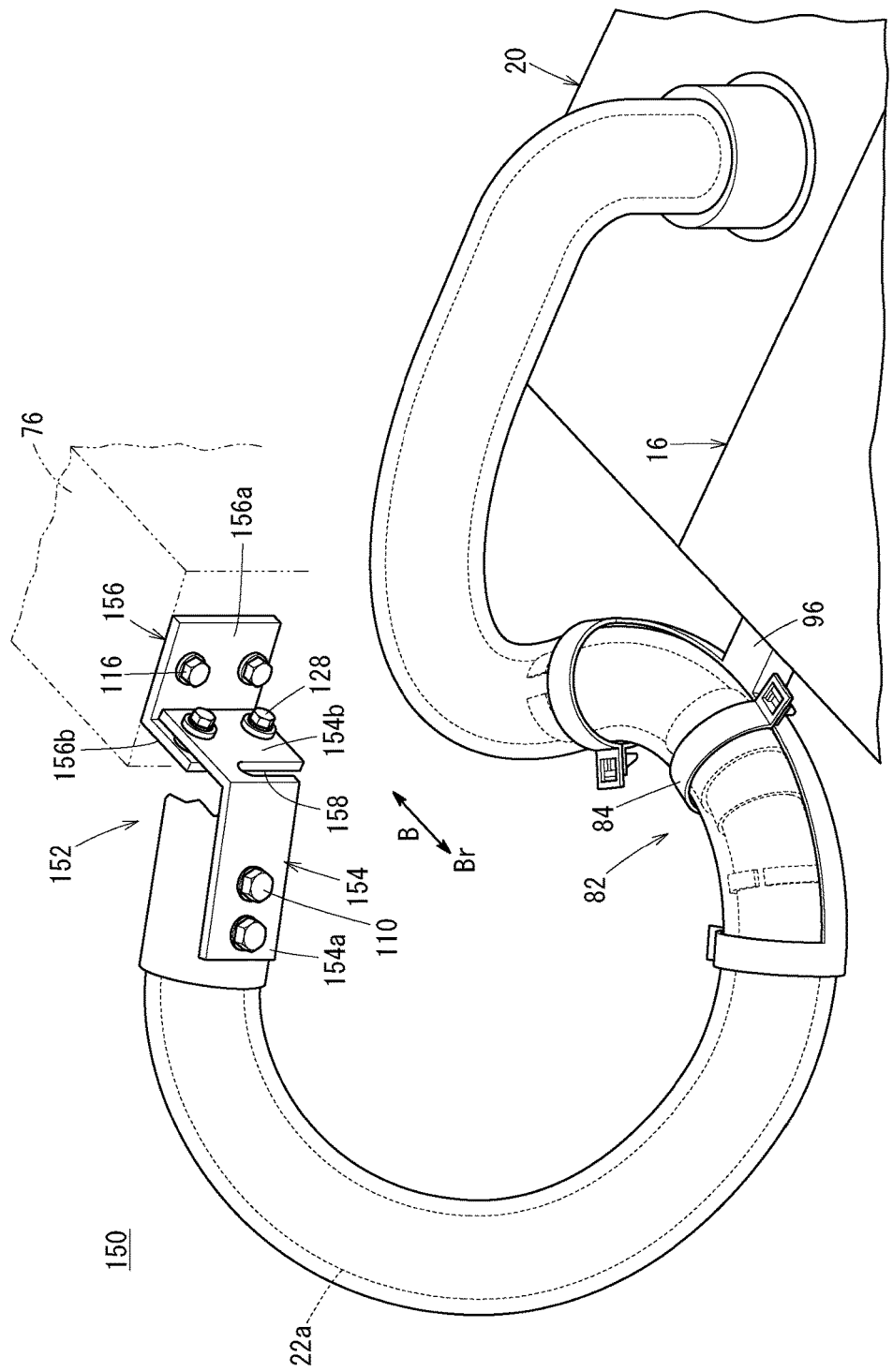
FIG. 12 is an explanatory perspective view of a principal part of a fuel cell vehicle according to a fourth embodiment of the present application.

FIG. 12 is an explanatory plan view of principal part of a securing mechanism 152 constituting a fuel cell vehicle 150 according to a fourth embodiment of the present application. In the fourth embodiment, the same components as those of the fuel cell vehicle 120 according to the second embodiment have the same reference numerals and symbols assigned, and repeated descriptions of the same components are omitted.

The securing mechanism 152 is provided with a pipe-side coupling member 154 provided at the other end of the elastic pipe portion 22a and a body-side coupling member 156 provided on the body-side mounting portion 76. The pipe-side coupling member 154 and the body-side coupling member 156 are coupled to each other with the pair of rubber mounts 128.

Figure 13:
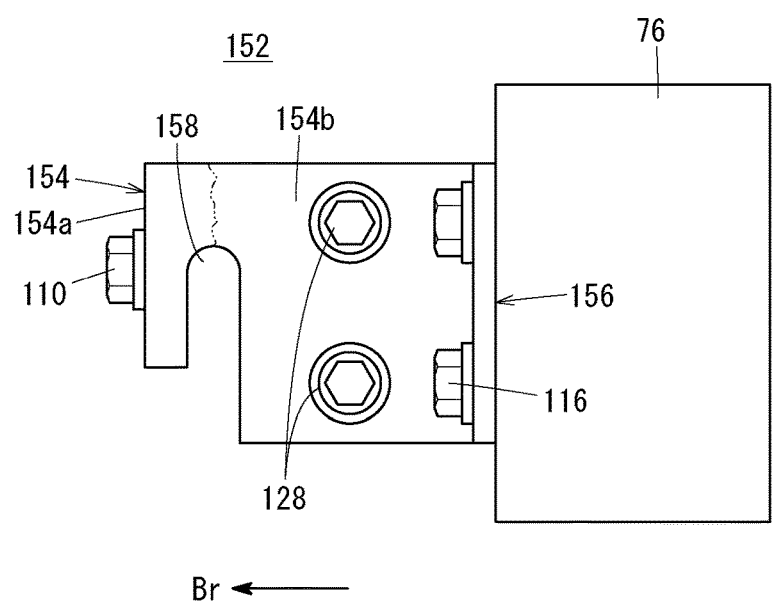
FIG. 13 is an explanatory front view of a securing mechanism constituting the fuel cell vehicle.

The pipe-side coupling member 154 is provided in an integral manner with an extending region 154a and a securing region 154b that is bent from an end of the extending region 154a. As shown in FIGS. 12 and 13, the securing region 154b is provided with a cutout region (lower-strength region) 158 that, when the fuel cell stack 16 moves relatively away from the body-side mounting portion 76, is broken to disable the securing function of the securing mechanism 152. The breaking load at which the cutout region 158 is broken is configured to be lower than the breaking load of the elastic pipe portion 22a.

The lower-strength region is not limited to the cutout region 158 and may be provided on, for example, a thin wall region or may be configured by forming an opening.

The body-side coupling member 156 is provided in an integral manner with an extending region 156a and a securing region 156b that is bent from an end of the extending region 156a. The securing region 156b is provided with the pair of rubber mounts 128.

With this arrangement, in the fourth embodiment, when an external load F is applied, the disengagement of the locking pawl 86 from the holder 84 is followed by the disengagement of the pipe-side coupling member 154 constituting the securing mechanism 152 from the body-side coupling member 156. More specifically, a tensile force is exerted on the pipe-side coupling member 154 from the elastic pipe portion 22a. Note that the securing region 154b is provided with a cutout region 158 and that the breaking load at which the cutout region 158 is broken is configured to be lower than the breaking load of the elastic pipe portion 22a.

Consequently, the securing region 154b is broken along the cutout region 158 (see two-dot chain line in FIG. 13), thereby enabling the elastic pipe portion 22a to be disengaged from the body-side coupling member 156. As described above, a simple and compact configuration can suppress breakage of the elastic pipe portion 22a as much as possible when the external load F is applied, while holding the elastic pipe portion 22a, providing the same effects as the first, second, and third embodiments described above.

A fuel cell vehicle according to the present application includes a fuel cell stack, a fuel tank, and a fuel feeding pipe. The fuel cell stack is disposed in a motor compartment provided in a front section of the vehicle and generates electric power by an electrochemical reaction of fuel gas and oxidant gas. The fuel tank is disposed in a rear section of the vehicle and stores the fuel gas. The fuel feeding pipe provides a connection between the fuel cell stack and the fuel tank.

The fuel feeding pipe has an elastic pipe portion that is secured at one end to the fuel cell stack and at the other end to a body-side mounting portion. The other end of the elastic pipe portion and the body-side mounting portion are coupled to each other with a securing mechanism. The other end of the elastic pipe portion is disengaged from the body-side mounting portion when the fuel cell stack moves relatively away from the body-side mounting portion in response to application of a predetermined load.

Preferably, the securing mechanism has a pipe-side coupling member provided on the other end of the elastic pipe portion, a body-side coupling member provided on the body-side mounting portion, and a rivet with which the pipe-side coupling member and the body-side coupling member are coupled to each other. Preferably, a shearing load of the rivet is configured to be lower than a breaking load of the fuel feeding pipe.

Preferably, in the fuel cell vehicle, a securing region of the pipe-side coupling member and a securing region of the body-side coupling member both of which are coupled to each other with the rivet overlap each other so as to extend in the direction in which the fuel cell stack moves relatively away from the body-side mounting portion.

Preferably, the securing mechanism has the pipe-side coupling member provided on the other side of the elastic pipe portion, the body-side coupling member provided on the body-side mounting portion, and a rubber mount with which the pipe-side coupling member and the body-side coupling member are coupled to each other.

Preferably, in the fuel cell vehicle, the pipe-side coupling member or the body-side coupling member has a cutout that extends in the direction in which the fuel cell stack moves relatively away from the body-side mounting portion and that is disengageable from the rubber mount.

Preferably, the rubber mount is provided so as to be disengageable from the pipe-side coupling member or the body-side coupling member when the fuel cell stack moves relatively away from the body-side mounting portion.

Preferably, the securing mechanism has the pipe-side coupling member provided on the other side of the elastic pipe portion and the body-side coupling member provided on the body-side mounting portion, and the pipe-side coupling member and the body-side coupling member are coupled to each other. Preferably, the pipe-side coupling member or the body-side coupling member has a lower-strength region that is broken to disable the securing function of the securing mechanism when the fuel cell stack moves relatively away from the body-side mounting portion.

The other end of the elastic pipe portion and the body-side mounting portion are coupled to each other with the securing mechanism. The other end of the elastic pipe portion is disengaged from the body-side mounting portion when the fuel cell stack moves relatively away from the body-side mounting portion in response to application of a predetermined load. With this arrangement, a simple and compact configuration can suppress breakage of the fuel feeding pipe as much as possible when an external load is applied, while holding the fuel feeding pipe.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell vehicle comprising:
a fuel cell stack that is disposed in a motor compartment provided in a front section of the vehicle and that generates electric power by an electrochemical reaction of fuel gas and oxidant gas;
a fuel tank that is disposed in a rear section of the vehicle and in which the fuel gas is stored; and
a fuel feeding pipe that provides a connection between the fuel cell stack and the fuel tank,
wherein the fuel feeding pipe has an elastic pipe portion that is secured at one end thereof to the fuel cell stack and at the other end thereof to a body-side mounting portion, and
wherein the other end of the elastic pipe portion and the body-side mounting portion are coupled to each other with a securing mechanism configured such that the other end of the elastic pipe portion is disengaged and separated from the body-side mounting portion when the fuel cell stack moves relatively away from the body-side mounting portion in response to application of a predetermined load, the securing mechanism including a pipe-side coupling member fastened to a surface of the elastic pipe portion with bolts that extend through the pipe-side coupling member to the surface of the elastic pipe portion.

2. The fuel cell vehicle according to claim 1,
wherein the pipe-side coupling member is provided on the other side of the elastic pipe portion, and the securing mechanism has a body-side coupling member provided on the body-side mounting portion and a rivet with which the pipe-side coupling member and the body-side coupling member are coupled to each other; and
wherein a shearing load of the rivet is lower than a breaking load of the fuel feeding pipe.

3. The fuel cell vehicle according to claim 2,
wherein a securing region of the pipe-side coupling member and a securing region of the body-side coupling member both of which are coupled to each other with the rivet overlap each other so as to extend in the direction in which the fuel cell stack moves relatively away from the body-side mounting portion.

4. The fuel cell vehicle according to claim 1,
wherein the pipe-side coupling member is provided on the other side of the elastic pipe portion, and the securing mechanism has a body-side coupling member provided on the body-side mounting portion and a rubber mount with which the pipe-side coupling member and the body-side coupling member are coupled to each other.

5. The fuel cell vehicle according to claim 4,
wherein the pipe-side coupling member or the body-side coupling member has a cutout that extends in the direction in which the fuel cell stack moves relatively away from the body-side mounting portion and that is disengageable from the rubber mount.

6. The fuel cell vehicle according to claim 4,
wherein the rubber mount is provided so as to be disengageable from the pipe-side coupling member or the body-side coupling member when the fuel cell stack moves relatively away from the body-side mounting portion.

7. The fuel cell vehicle according to claim 1,
wherein the pipe-side coupling member is provided on the other side of the elastic pipe portion, and the securing mechanism has a body-side coupling member provided on the body-side mounting portion; and
wherein the pipe-side coupling member and the body-side coupling member are coupled to each other and the pipe-side coupling member or the body-side coupling member has a lower-strength region that is broken to disable the securing function of the securing mechanism when the fuel cell stack moves relatively away from the body-side mounting portion.

8. A fuel cell vehicle comprising:
a fuel cell stack disposed in a front section of the fuel cell vehicle to generate electric power via an electrochemical reaction of fuel gas and oxidant gas;
a fuel tank to store the fuel gas therein disposed in a rear section of the fuel cell vehicle;
a body-side mounting portion;
a fuel feeding pipe connecting the fuel tank and the body-side mounting portion to supply fuel from the fuel tank to the fuel cell stack;
a securing mechanism; and
an elastic pipe connected to the fuel cell stack at a first end of the elastic pipe and connected, via the securing mechanism, to the body-side mounting portion at a second end of the elastic pipe opposite to the first end such that the second end of the elastic pipe is disengaged and separated from the body-side mounting portion when a load larger than a predetermined threshold load is applied to the securing mechanism, the securing mechanism including a pipe-side coupling member fastened to a surface of the elastic pipe with bolts that extend through the pipe-side coupling member to the surface of the elastic pipe portion.

9. The fuel cell vehicle according to claim 8,
wherein the pipe-side coupling member is provided on the elastic pipe, and the securing mechanism has a body-side coupling member provided on the body-side mounting portion and a rivet with which the pipe-side coupling member and the body-side coupling member are coupled to each other; and
wherein a shearing load of the rivet is lower than a breaking load of the fuel feeding pipe.

10. The fuel cell vehicle according to claim 9,
wherein a securing region of the pipe-side coupling member and a securing region of the body-side coupling member both of which are coupled to each other with the rivet overlap each other so as to extend in the direction in which the fuel cell stack moves relatively away from the body-side mounting portion.

11. The fuel cell vehicle according to claim 8,
wherein the pipe-side coupling member is provided on the elastic pipe, and the securing mechanism has a body-side coupling member provided on the body-side mounting portion and a rubber mount with which the pipe-side coupling member and the body-side coupling member are coupled to each other.

12. The fuel cell vehicle according to claim 11,
wherein the pipe-side coupling member or the body-side coupling member has a cutout that extends in the direction in which the fuel cell stack moves relatively away from the body-side mounting portion and that is disengageable from the rubber mount.

13. The fuel cell vehicle according to claim 11,
wherein the rubber mount is provided so as to be disengageable from the pipe-side coupling member or the body-side coupling member when the fuel cell stack moves relatively away from the body-side mounting portion.

14. The fuel cell vehicle according to claim 8,
wherein the pipe-side coupling member is provided on the elastic pipe, and the securing mechanism has a body-side coupling member provided on the body-side mounting portion; and
wherein the pipe-side coupling member and the body-side coupling member are coupled to each other and the pipe-side coupling member or the body-side coupling member has a lower-strength region that is broken to disable the securing function of the securing mechanism when the fuel cell stack moves relatively away from the body-side mounting portion.

15. The fuel cell vehicle according to claim 8,
wherein the fuel cell stack is disposed in a motor compartment.

16. The fuel cell vehicle according to claim 8,
wherein the second end of the elastic pipe is disengaged from the body-side mounting portion when the fuel cell stack relatively moves away from the body-side mounting portion.

17. The fuel cell vehicle according to claim 1,
wherein the pipe-side coupling member is provided on the other side of the elastic pipe portion, and the securing mechanism has a body-side coupling member provided on the body-side mounting portion, and
wherein a rivet with a shearing load that is lower than a breaking load of the fuel feeding pipe or a disengageable rubber mount couples the pipe-side coupling member to the body-side coupling member so as to allow the elastic pipe portion to disengage and separate from the body-side mounting portion when the fuel cell stack moves relatively away from the body-side mounting portion in response to application of the predetermined load.

18. The fuel cell vehicle according to claim 8,
wherein the pipe-side coupling member is provided on the other side of the elastic pipe portion, and the securing mechanism has a body-side coupling member provided on the body-side mounting portion, and
wherein a rivet with a shearing load that is lower than a breaking load of the fuel feeding pipe or a disengageable rubber mount couples the pipe-side coupling member to the body-side coupling member so as to allow the elastic pipe portion to disengage and separate from the body-side mounting portion when the fuel cell stack moves relatively away from the body-side mounting portion in response to application of the predetermined load.

19. The fuel cell vehicle according to claim 1,
wherein when the other end of the elastic pipe portion is disengaged and separated from the body-side mounting portion, at least a part of the pipe-side coupling member remains fastened to the surface of the elastic pipe portion.

20. The fuel cell vehicle according to claim 8,
wherein when the second end of the elastic pipe is disengaged and separated from the body-side mounting portion, at least a part of the pipe-side coupling member remains fastened to the surface of the elastic pipe portion.

21. The fuel cell vehicle according to claim 1, further comprising:
a retaining member provided at a halfway portion of the elastic pipe portion to retain the elastic pipe portion on the fuel cell stack,
wherein the retaining member includes:
a holder that is coupled to the halfway portion of the elastic pipe portion and holds the elastic pipe portion in a curved state; and
a locking pawl that is mounted on the fuel cell stack and is coupled to the holder such that the locking pawl is disengageable from the holder when subjected to a predetermined load.

22. The fuel cell vehicle according to claim 8, further comprising:
a retaining member provided at a halfway portion of the elastic pipe portion to retain the elastic pipe portion on the fuel cell stack,
wherein the retaining member includes:
a holder that is coupled to the halfway portion of the elastic pipe portion and holds the elastic pipe portion in a curved state; and
a locking pawl that is mounted on the fuel cell stack and is coupled to the holder such that the locking pawl is disengageable from the holder when subjected to a predetermined load.

* * * * *